(12) United States Patent
Godin et al.

(10) Patent No.: US 12,185,390 B2
(45) Date of Patent: Dec. 31, 2024

(54) DATA TRANSMISSION WITH STATELESS ROUTING

(71) Applicant: Nokia Technologies Oy, Espoo (FI)

(72) Inventors: Philippe Godin, Versailles (FR); Daniela Laselva, Klarup (DK); Subramanya Chandrashekar, Bangalore (IN); Rakash Sivasiva Ganesan, Unterhaching (DE); Srinivasan Selvaganapathy, Bangalore (IN); Alberto Martínez-Alba, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 635 days.

(21) Appl. No.: 17/480,445

(22) Filed: Sep. 21, 2021

(65) Prior Publication Data

US 2022/0117006 A1 Apr. 14, 2022

(30) Foreign Application Priority Data

Oct. 9, 2020 (IN) .............................. 202041044107

(51) Int. Cl.
*H04W 4/00* (2018.01)
*H04W 12/106* (2021.01)
(Continued)

(52) U.S. Cl.
CPC ......... *H04W 76/10* (2018.02); *H04W 12/106* (2021.01); *H04W 12/75* (2021.01)

(58) Field of Classification Search
CPC ..... H04W 76/11; H04W 76/12; H04W 12/75; H04W 76/10; H04W 72/04; H04W 72/50
See application file for complete search history.

(56) References Cited

U.S. PATENT DOCUMENTS

2019/0182211 A1* 6/2019 Yang ..................... H04L 69/326
2019/0223154 A1* 7/2019 Jia .......................... H04W 68/02
(Continued)

FOREIGN PATENT DOCUMENTS

| WO | 2020/036460 A1 | 2/2020 |
| WO | 2020/166817 A1 | 8/2020 |
| WO | 2020/171369 A1 | 8/2020 |

OTHER PUBLICATIONS

Partial European Search Report received for corresponding European Patent Application No. 21198217.8, dated Mar. 9, 2022, 16 pages.
(Continued)

*Primary Examiner* — Shantell L Heiber
(74) *Attorney, Agent, or Firm* — Lippes Mathias LLP

(57) ABSTRACT

Systems, methods, apparatuses, and computer program products for data transmission with stateless routing are provided. Certain embodiments may include a radio resource control (RRC)—less or RRC-based mechanism for short data transmission (SDT) in an RRC inactive state, where the mechanism may be performed without storing or establishing a UE context in a distributed unit (DU), for a UE served by a single CU-user plane (UP). Certain embodiments may include a RRC-less mechanism for SDT in an RRC inactive state, where the authentication of the user equipment (UE) may be performed at the UP using UP integrity protection (IP) in a CU-UP. Certain embodiments may include a RRC-based mechanism for SDT in an RRC inactive state, where the authentication of the UE may be performed at the UP using UP IP in a CU-UP and/or at the CP using CP IP in a CU-CP.

18 Claims, 10 Drawing Sheets

(51) Int. Cl.
*H04W 12/75* (2021.01)
*H04W 76/10* (2018.01)

(56) References Cited

U.S. PATENT DOCUMENTS

| | | | |
|---|---|---|---|
| 2020/0015074 | A1 | 1/2020 | Kim et al. |
| 2020/0015088 | A1* | 1/2020 | Luo .................. H04W 12/041 |
| 2020/0137564 | A1 | 4/2020 | Liu et al. |
| 2020/0163149 | A1 | 5/2020 | Mildh et al. |
| 2020/0275498 | A1* | 8/2020 | Fiorani ................. H04W 76/11 |
| 2020/0383035 | A1* | 12/2020 | Ma ........................ H04W 76/16 |
| 2023/0319909 | A1* | 10/2023 | Dai ....................... H04W 76/11 370/329 |
| 2023/0371079 | A1* | 11/2023 | Wang ................ H04W 72/0453 |

OTHER PUBLICATIONS

"3rd Generation Partnership Project; Technical Specification Group Services and System Aspects; Security architecture and procedures for 5G system (Release 16)", 3GPP TS 33.501, V16.4.0, Sep. 2020, pp. 1-250.

"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.

"3rd Generation Partnership Project; Technical Specification Group Radio Access Network; NG-RAN; Architecture description (Release 16)", 3GPP TS 38.401, V16.2.0, Jul. 2020, pp. 1-77.

"3rd Generation Partnership Project; Technical Specification Group Radio Access Network; NG-RAN; E1 Application Protocol (E1AP) (Release 16)", 3GPP TS 38.463, V16.2.0, Jul. 2020, pp. 1-230.

"3rd Generation Partnership Project; Technical Specification Group Radio Access Network; NG-RAN; F1 application protocol (F1AP) (Release 16)", 3GPP TS 38.473, V16.2.0, Jul. 2020, pp. 1-363.

"3rd Generation Partnership Project; Technical Specification Group Services and System Aspects; Security architecture and procedures for 5G system (Release 16)", 3GPP TS 33.501, V16.3.0, Jul. 2020, pp. 1-248.

"Work Item on NR smalldata transmissions in INACTIVE state", 3GPP TSG RAN Meeting #86, RP-193252, Agenda: 9.1.2, ZTE Corporation, Dec. 9-12, 2019, 4 pages.

"SDT mechanism on RRC/non-RRC based approaches and RACH requirements", 3GPP TSG RAN WG2 Meeting #111-e, R2-2006713, Agenda: 8.6.2, Intel Corporation, Aug. 17-28, 2020, 10 pages.

"Radio bearer configuration for SDT considering UE context relocation and CU/DU split", 3GPP TSG RAN WG2 Meeting #111-e, R2-2006714, Agenda: 8.6.2, Intel Corporation, Aug. 17-28, 2020, 6 pages.

"Selection between RRC-based and RRC-less solutions for IDT", 3GPP TSG-RAN2#111e, R2-2007448, Agenda: 3.6.2, ZTE Corporation, Aug. 17-28, 2020, 13 pages.

Extended European Search Report received for corresponding European Patent Application No. 21198217.8, dated Jun. 14, 2022, 15 pages.

* cited by examiner

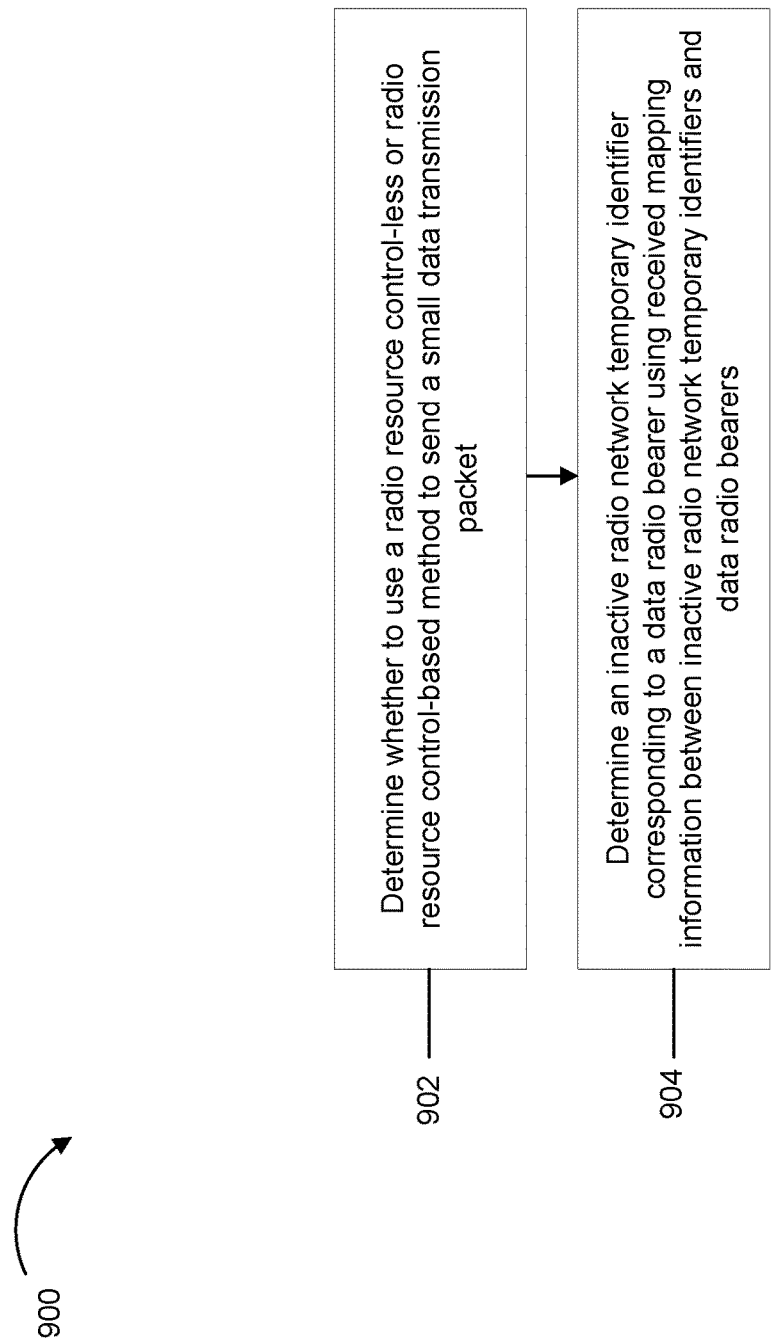

us 12,185,390 B2

DATA TRANSMISSION WITH STATELESS ROUTING

CROSS REFERENCE TO RELATED APPLICATIONS

This application claims priority from IN Provisional Application No. 202041044107, filed on Oct. 9, 2020. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for data transmission with stateless routing.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include determining, for a distributed unit entity of the network node, an identifier for a central unit-user plane entity of the network node which is connected to the distributed unit entity. The method may include providing, to the distributed unit entity, the determined identifier of the central unit-user plane entity. The method may include determining an inactive radio network temporary identifier for a user equipment. A portion of the inactive radio network temporary identifier may include the identifier of the central unit-user plane entity which serves the user equipment. The method may include sending, to the user equipment, information including at least the determined inactive radio network temporary identifier.

In a variant, the method may include providing an update of the identifier of the central unit-user plane entity to the distributed unit entity or an indication that radio resource control-less small data transmission is disabled or enabled. In a variant, the portion of the inactive radio network temporary identifier may be statically reserved. In a variant, the information may include an indication to indicate to the user equipment to use a radio resource control-based small data transmission procedure for a subsequent small data transmission. In a variant, the information may include an identifier of the network node.

In a variant, the method may include receiving a packet including the inactive radio network temporary identifier from the distributed unit entity, identifying a context of the user equipment using the received inactive radio network temporary identifier, selecting another central unit-user plane entity associated with the distributed unit entity different than the central unit-user plane entity serving the user equipment, sending the context and the packet to the other central unit-user plane entity, and triggering deletion of the user equipment context in the former central unit-user plane entity. In a variant, the method may include receiving a packet including the inactive radio network temporary identifier from the distributed unit entity, identifying a context of the user equipment using the received inactive radio network temporary identifier, creating a context and obtaining a tunnel endpoint for the user equipment in another central unit-user plane entity associated with the distributed unit entity, sending the obtained tunnel endpoint to the distributed unit, and triggering deletion of the user equipment context in the former central unit-user plane entity. In a variant, the other central unit-user plane entity may be different than the central unit-user plane entity serving the user equipment.

In a variant, the method may include allocating a new inactive radio network temporary identifier, and including the new inactive radio network temporary identifier in the information sent to the user equipment. In a variant, the information sent to the user equipment may further comprise a mapping between the inactive radio network temporary identifier and a data radio bearer and between one or more other inactive radio network temporary identifiers and one or more other data radio bearers. In a variant, the method may include receiving a radio resource control message including the inactive radio network temporary identifier, and a control plane mobile authentication code-integrity from the distributed unit entity, identifying a context of the user equipment using the received inactive radio network temporary identifier, checking a validity of the control plane mobile authentication code-integrity, and sending a result of the checking to the distributed unit entity or the central unit-user plane entity serving the user equipment.

In a variant, the sending may include sending the information in one of: a radio resource control message, a medium access control element, or a system information message. In a variant, the information may comprise a request to move the user equipment to a radio resource control inactive state.

According to a second embodiment, a method may include receiving an identifier for a central unit-user plane entity of a network node. The distributed unit entity may be connected with the central unit-user plane entity. The method may include receiving a data packet from the user equipment. The data packet may include at least a payload and an inactive radio network temporary identifier, and may optionally include a radio resource control message. The payload may optionally include a user plane integrity protection code. A portion of the inactive radio network temporary identifier may include the identifier of the central unit-user plane entity. The method may include attempting to determine an identity of the central unit-user plane entity from the portion of the inactive radio network temporary identifier. The method may include sending a derived packet to the central unit-user plane entity if the identity is determined, or if the identity is not determined, triggering a central unit-control plane entity to assign a new central unit-user plane entity.

In a variant, the method may include, if the identity is not determined, either: forwarding the packet to the central unit-control plane entity for further forwarding of the derived packet, or holding the derived packet until a tunnel endpoint of the assigned central unit-user plane entity or an identification of the assigned control unit-user plane entity is obtained from the central unit-control plane entity and sending the derived packet to the assigned central unit-user plane entity. In a variant, the sending may include sending the derived packet based on an indication received from the central unit-control plane entity that a control plane mobile authentication code-integrity is successful. In a variant, the method may include receiving, from the central unit-control plane entity, an update of the identifier of the central unit-user plane entity or an indication that radio resource control-less small data transmission is disabled or enabled.

In a variant, the attempting may include attempting to determine the identity based on a particular medium access control frame format, a particular indication in the medium access control control element, a presence of a radio resource control message, or a particular bit included in the received data packet. In a variant, the sending may include sending the payload and the inactive radio network temporary identifier to the central unit-user plane entity and optionally sending information related to integrity protection validation. In a variant, the information related to the integrity protection validation may include the identifier of a cell managed by the distributed unit entity over which the packet was received.

In a variant, the packet may be received without a radio resource control message. In a variant, the inactive radio network temporary identifier included in the packet may be associated with a particular data radio bearer. In a variant, the packet may further comprise a radio resource control message. In a variant, the method may include sending the radio resource control message to the central unit-control plane entity when sending the derived packet.

According to a third embodiment, a method may include receiving a payload and an inactive radio network temporary identifier, and optionally other information related to validation of a user plane integrity protection code from a distributed unit entity or a central unit-control plane entity of the network node. The central unit-user plane entity may be connected to the distributed unit entity. The payload may include the user plane integrity protection code. The method may include identifying a user equipment context from the received inactive radio network temporary identifier and identifying a user plane integrity protection key in the user equipment context. The method may include validating an authenticity of the payload based on one or more of the received user plane integrity protection code, the received information related to validation of the user plane integrity protection code, and the identified user plane integrity protection key. The method may include processing and sending the payload to a user plane function associated with the user equipment context if the authenticity of the payload is validated. The method may include sending, via the distributed unit entity, a message to the user equipment. The message may indicate that the payload has been successfully processed.

In a variant, the message may comprise a layer 2 acknowledgement or may comprise a short mobile authentication code in a medium access control control element. In a variant, the method may include receiving the user equipment context from the central unit-control plane entity. In a variant, the message may additionally comprise a particular indication to request the user equipment to use a radio resource control-based small data transmission for a subsequent small data transmission or to perform a radio area network notification area update procedure.

According to a fourth embodiment, a method may include determining whether to use a radio resource control-less or radio resource control-based method to send a small data transmission packet. The method may include determining an inactive radio network temporary identifier corresponding to a data radio bearer using received mapping information between inactive radio network temporary identifiers and data radio bearers.

In a variant, the method may include determining a user plane integrity protection code for a payload based on the determination of the radio resource method, sending the small data transmission packet to a distributed unit entity, receiving a message from a central unit-user plane entity of the network node via the distributed unit entity, and authenticating the message based on a short mobile authentication code included in the message. The packet may comprise the payload and the inactive radio network temporary identifier and may optionally comprise a radio resource control message for the user equipment. In a variant, the payload may include the user plane integrity protection code. In a variant, the method may include receiving, from a central unit-control plane entity of the network node, information comprising the mapping between the data radio bearers and the inactive radio network temporary identifiers.

In a variant, a portion of the inactive radio network temporary identifier may include an identifier of a central unit-user plane entity. In a variant, the message may indicate that the packet has been successfully processed by the network node. In a variant, the inactive radio network temporary identifier included in the packet sent by the user equipment may be related to a data radio bearer to which the payload belongs using the received mapping information. In a variant, the receiving the information may include receiving the information in one of: a radio resource control message, a medium access control element, or a system information message. In a variant, the information may include a request to move the user equipment to a radio resource control inactive state.

A fifth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, or the fourth embodiment, or any of the variants discussed above.

A sixth embodiment may be directed to an apparatus that may include circuitry configured to perform the method according to the first embodiment, the second embodiment, the third embodiment, or the fourth embodiment, or any of the variants discussed above.

A seventh embodiment may be directed to an apparatus that may include means for performing the method according to the first embodiment, the second embodiment, the third embodiment, or the fourth embodiment, or any of the variants discussed above. Examples of the means may include one or more processors, memory, and/or computer program codes for causing the performance of the operation.

An eighth embodiment may be directed to a computer readable medium comprising program instructions stored thereon for performing at least the method according to the first embodiment, the second embodiment, the third embodiment, or the fourth embodiment, or any of the variants discussed above.

A ninth embodiment may be directed to a computer program product encoding instructions for performing at least the method according to the first embodiment, the second embodiment, the third embodiment, or the fourth embodiment, or any of the variants discussed above.

BRIEF DESCRIPTION OF THE DRAWINGS

For proper understanding of example embodiments, reference should be made to the accompanying drawings, wherein:

FIG. 9 illustrates an example flow diagram of a method, according to some embodiments;

SUMMARY

Figure 1:
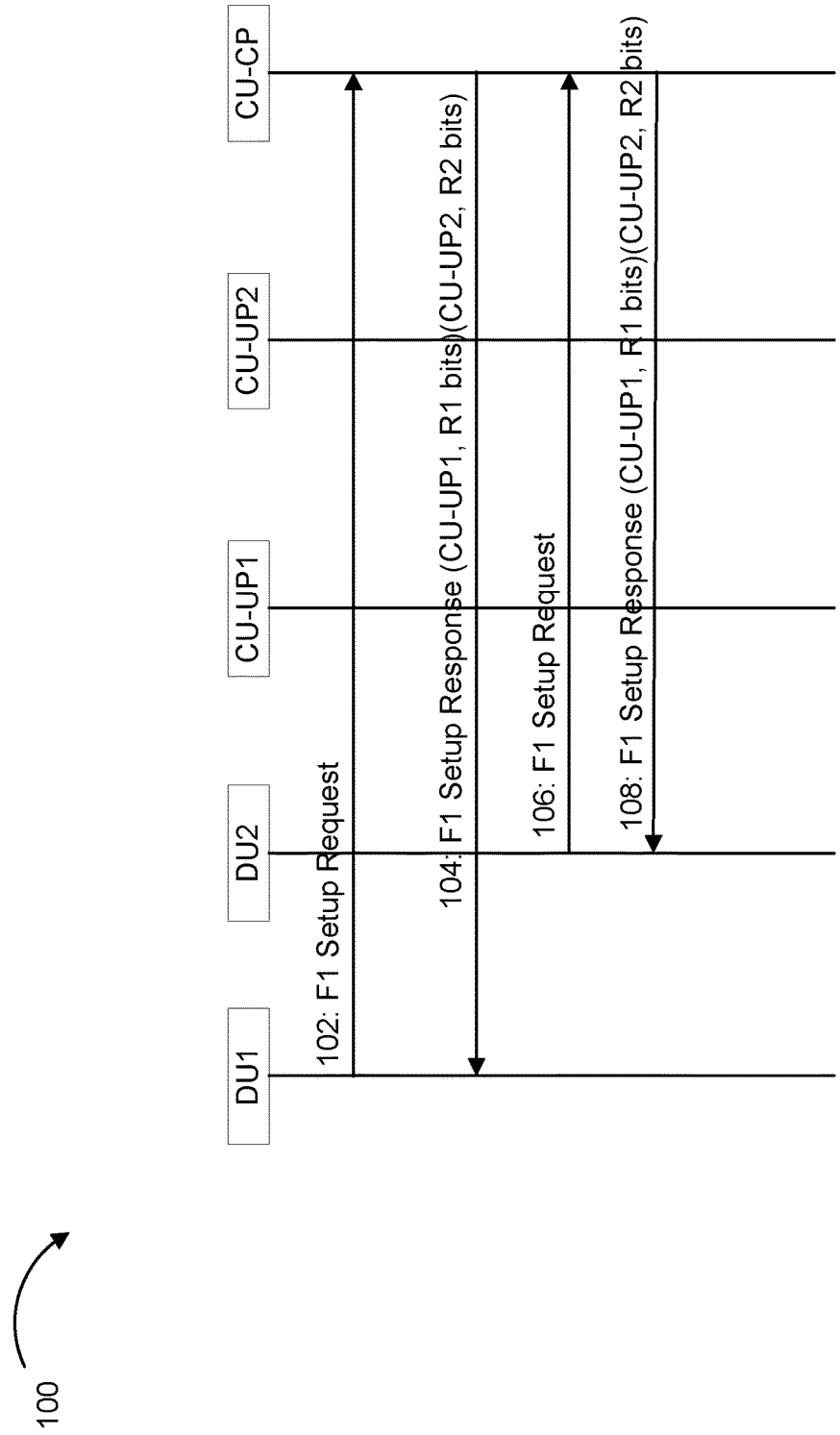
FIG. 1 illustrates an example signal diagram for assignment of R bits, according to some embodiments.

According some aspects, there is provided the subject matter of the independent claims. Some further aspects are defined in the dependent claims. The embodiments that do not fall under the scope of the claims are to be interpreted as examples useful for understanding the disclosure.

In a first aspect thereof the exemplary embodiments of this invention provide an apparatus comprising: comprising: at least one processor; and at least one memory comprising computer program code, the at least one memory and computer program code configured, with the at least one processor, to cause the apparatus at least to: determine, by the apparatus for a distributed unit entity of a network node, an identifier for a central unit-user plane entity of the network node which is connected to the distributed unit entity; provide, to the distributed unit entity, the determined identifier of the central unit-user plane entity; determine an inactive radio network temporary identifier for a user equipment, wherein a portion of the inactive radio network temporary identifier includes the identifier of the central unit-user plane entity which serves the user equipment; and send, to the user equipment, information including at least the determined inactive radio network temporary identifier In a further aspect thereof the exemplary embodiments of this invention provide an apparatus comprising: at least one processor; and at least one memory comprising computer program code, the at least one memory and computer program code configured, with the at least one processor, to cause the apparatus at least to: receive, by the apparatus, an identifier for a central unit-user plane entity of a network node, wherein the apparatus is connected with the central unit-user plane entity; receive a data packet from a user equipment, wherein the data packet includes at least a payload and an inactive radio network temporary identifier, wherein a portion of the inactive radio network temporary identifier includes the identifier of the central unit-user plane entity; attempt to determine an identity of the central unit-user plane entity from the portion of the inactive radio network temporary identifier; and sending a packet derived from the received data packet to the central unit-user plane entity if the identity is determined, or if the identity is not determined, triggering a central unit-control plane entity to assign a new central unit-user plane entity.

In another aspect thereof the exemplary embodiments of this invention provide an apparatus comprising: at least one processor; and at least one memory comprising computer program code, the at least one memory and computer program code configured, with the at least one processor, to cause the apparatus at least to: determine by the apparatus whether to use a radio resource control-less or radio resource control-based method to send a small data transmission packet; and determine an inactive radio network temporary identifier corresponding to a data radio bearer using received mapping information received from a network node between inactive radio network temporary identifiers and data radio bearers.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for data transmission with stateless routing is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

An I-RNTI may be allocated by a last serving gNB (also referred to an anchor gNB) to a UE that is being moved to an RRC inactive state. The I-RNTI may be configured as part of an RRC release with a suspend configuration message, and the UE may transmit the I-RNTI within the RRC resume request message. An I-RNTI (e.g., with a length of 40 bits) may include a way to identify both the UE and the last serving gNB, such as a UE identifier part and gNB identifier part. An algorithm used to construct the I-RNTI may be specific to a vendor, including the decision on the position within the I-RNTI and number of bits used for the UE identifier and the gNB identifier parts. NR may not specify the number of bits that should be used to identify the gNB and the number of bits that should be used to identify the UE within the total I-RNTI bits, nor the position of the UE identifier and the anchor gNB identifier parts within the I-RNTI. The UE mobility may be tracked if the I-RNTI over the air is intercepted. This is because the RRC resume request message sent by the UE to the network to resume its connection, including the I-RNTI, may be sent on the common control channel (CCCH) that is not secured. To avoid UE tracking, the UE identifier part of the I-RNTI assigned by the network may be different in consecutive suspensions for the same UE.

NR has previously considered three mechanisms for enabling small data transmission (SDT) in an uplink direction in a 5G NR system. One mechanism may include a 4-step random access channel (RACH)-based SDT where user plane (UP) data may be transmitted in a message 3 (msg3) of the 4-step procedure (e.g., a small payload multiplexed with an RRC connection resume request). The second mechanism may include a 2-step RACH-based SDT where the UP data transmission may occur with a message A (msgA) of the 2-step procedure. Specifically, the UP data may be sent on physical uplink shared channel (PUSCH) resources that are pre-configured by the gNB and broadcast in system information with associated physical transmission parameters. The third mechanism may include a configured grant-based SDT where a UE in an RRC connected state can receive a configured grant (CG) type1 configuration that indicates the specific pre-configured PUSCH resources to be used for an uplink (UL) data transmission. This CG configuration can also be used when the UE is in an RRC inactive state as long as the timing alignment is valid.

The 5G access stratum (AS) security context may be stored by UEs in RRC inactive state within the UE inactive AS context. The AS context may include cryptographic keys at the gNB AS level with their identifiers, a next hop (NH) parameter, a next hop chaining counter parameter (NCC) used for next hop access key derivation, identifiers of selected AS level cryptographic algorithms, and counters used for replay protection. The gNB may choose the ciphering and integrity algorithm that has the highest priority from its configured list and is also present in the UE 5G security capabilities. The chosen algorithm may be indicated to the UE in the AS security mode command (SMC), where the AS SMC procedure may be for RRC and UP security algorithms negotiation and RRC security activation. During initial AS security context establishment at the gNB, the UE may derive a gNB key (a $K_{gNB}$) and a NH parameter directly from an access and mobility management function (AMF) key (a $K_{AMF}$). An NCC may also be associated with the $K_{gNB}$ and NH parameter, initially having a value equal to, for example, one.

At handovers and RRC state transitions, the $K_{gNB}$ that may be used between the UE and the target gNB (a $K_{gNB}*$), may be derived either from the currently active $K_{gNB}$ or from the NH parameter. If the $K_{gNB}*$ is derived from the currently active $K_{gNB}$, this may be referred to as a horizontal key derivation and may be indicated to the UE with an NCC that does not increase. If the $K_{gNB}*$ is derived from the NH parameter, the derivation may be referred to as a vertical key derivation and may be indicated to the UE with an NCC increase. Keys for the protection of RRC signaling with a particular integrity ($K_{RRCint}$), for protection of RRC signaling with a particular encryption algorithm ($K_{RRCenc}$), for the protection of UP traffic over the radio interface with a particular integrity ($K_{UPint}$), and with a particular encryption algorithm ($K_{UPenc}$) may be derived based on the $K_{gNB}$ after a new $K_{gNB}$ is derived.

The handling of the security keys at the gNB and UE at the RRC state transitions from RRC connected state to inactive state may be part of NR. For example, the gNB may send, to the UE, an RRCRelease with suspend configuration message, including a new I-RNTI and an NCC. If the gNB has a new and unused pair of {NCC, NH}, it may include it in the RRC release message, otherwise it may include the same NCC associated with the current $K_{gNB}$. The gNB may delete the current AS keys, including the $K_{RRCenc}$, $K_{UPenc}$ and $K_{UPint}$ after sending the RRC release with the suspend configuration message to the UE, but may keep the current AS key $K_{RRCint}$. If the sent NCC value is new and belongs to an unused pair of {NCC, NH}, the gNB may save the pair of {NCC, NH} in the current UE AS security context and may delete the current AS $K_{gNB}$. If the sent NCC value is equal to the NCC value associated with the current $K_{gNB}$, the gNB may keep the current AS key $K_gNB$ and NCC. The gNB may store the sent I-RNTI together with the current UE context including the remainder of the AS security context.

Upon receiving the RRC Release with suspend configuration message, the UE may verify that the integrity of the received message is correct by checking the packet data convergence protocol (PDCP) message authentication code-integrity (MAC-I). If this verification is successful, then the UE may use the received NCC value and save it with the current UE context. The UE may delete the current AS keys, including $K_{RRCenc}$, $K_{UPenc}$ and $K_{UPint}$, but may keep the current AS $K_{RRCint}$. If the stored NCC value is different from the NCC value associated with the current $K_{gNB}$, the UE may delete the current AS $K_{gNB}$. If the stored NCC is equal to the NCC value associated with the current $K_{gNB}$, the UE may keep the current AS key $K_{gNB}$. The UE may store the received I-RNTI together with the current UE context, including the remainder of the AS security context, for the next state transition.

The handling of the security keys at gNB and UE at the RRC state transitions to the RRC connected state from the RRC inactive state may also be part of NR. For example, when the UE attempts resuming, the RRC resume request message may include the I-RNTI for context identification and a resume MAC-I/short resume MAC-I. The latter may be a 16-bit message authentication token that the UE may calculate using the integrity algorithm (NR integrity algorithm (NIA) or evolved packet system (EPS) integrity algorithm (EIA)) in the stored AS security context, which may be negotiated between the UE and the source gNB/NG-eNB, and using the current $K_{RRCint}$ with certain known inputs, such as key, bearer, direction, count, and message inputs.

When the target node receives the RRC resume request message from the UE, it may extract the I-RNTI and may contact the source node based on the information in the I-RNTI by sending an Xn application protocol (Xn-AP) retrieve UE context request message with the I-RNTI, the resume MAC-I/short resume MAC-I and target cell identifier included. This may allow the source node to validate the UE request and to retrieve the UE context including the UE 5G AS security context.

The source node may retrieve the stored UE context including the UE 5G AS security context from its database using the I-RNTI. It may first verify the resume MAC-I/short resume MAC-I using the current $K_{RRCint}$ key stored in the retrieved UE 5G AS security context (calculating the resume MAC-I/short resume MAC-I). If the verification of the resume MAC-I/short resume MAC-I is successful, then the source gNB/NG-eNB may calculate a key for NG-RAN ($K_{NG-RAN}*$) using the target cell physical cell identity (PCI), target downlink absolute radio frequency channel number (ARFCN-DL)/downlink E-UTRA absolute radio frequency channel number (EARFCN-DL), and the $K_{gNB}$/NH in the current UE 5G AS security context. The calculation may be based on either a horizontal key derivation or a vertical key derivation according to whether the source node has an unused pair of {NCC, NH}.

The source node can obtain the target PCI and target ARFCN-DL/EARFCN-DL from a cell configuration database by using the target cell identifier, which may have been received from the target gNB/NG-eNB. Then the source node may respond with an Xn-AP retrieve UE context response message to the target node including the UE context that contains the UE 5G AS security context. The UE 5G AS security context sent to the target node may include the newly derived $K_{NG-RAN}*$, the NCC associated with the $K_{NG-RAN}*$, the UE 5G security capabilities, UP security policy, UP security activation status with corresponding protocol data unit (PDU) session identifier(s), and ciphering and integrity algorithms used by the UE with the source cell.

NR may include keys handling while in an RRC inactive state at RAN notification area (RNA) updates. At an RNA update, if the target node selects the ciphering and integrity protection algorithms that the UE used with the last source cell, and the target node (gNB/NG-eNB) decides to send the UE directly back to the RRC inactive state without bringing the UE to the RRC connected state, then the target node may perform a path switch procedure with the AMF to get a new {NCC, NH} pair before sending the RRC release message to the UE. The value of NCC in the RRC release message with the suspend indication may then be set to the NCC value of the received new {NCC, NH} pair. After the source node validates the resume MAC-I/short resume MAC-I received from the target node in the retrieve UE context request message, the previous node may decide not to relocate the UE context to the new node. In this case, the previous node may build the RRC release message (msg4) with a new I-RNTI, may integrity protect it, and may encrypt it using the RRC keys that were derived from the new $K_{gNB}*$ similar to RRC resume message (msg4) protection. Then, the previous node may send the integrity protected and encrypted RRC release message to the new node in the retrieve UE context failure message.

In NR, RRC-less SDT solutions may be limited to the same cell and/or for CG-based SDT. This means that the solution does not work when the UE that sent the packet has changed cells or when CG-based SDT cannot be used. Based on this, there would be advantages if an RRC-less SDT mechanism could be extended to also be used when the UE resumes in a different cell of a same DU or a cell of a different DU, but associated with the same CU-UP, or even to a cell of a same gNB. The RRC-less mechanisms may be incomplete in cases where the target cell is served by a different CU-UP than the previous serving cell. In addition, the scenario where a UE might have two different bearers served by different CU-UPs has not been previously addressed in NR.

Some embodiments described herein may provide data transmission with DU-stateless routing in the DU (e.g., no context stored in the DU). Certain embodiments may include an RRC-less mechanism for SDT in an RRC inactive state, where the authentication of the UE may be performed at the user plane using UP integrity protection (IP) in a CU-UP. In certain embodiments, the RRC-less SDT mechanism (e.g., with no involvement of a CU-control plane (CP) and/or RRC) may be performed without storing or establishing a UE context in a gNB-DU, for a UE served by a single CU-UP. This may provide for omission of the CP IP validation that would otherwise be performed for RRC messages (e.g., which may have to be performed for the RRC resume request message in RRC-based SDT) as CP IP may be replaced by UP IP. In certain embodiments, the RRC-less mechanism may be extended to a UE with at least two data radio bearers (DRBs) served by different CU-UPs. In certain embodiment, an RRC-based SDT mechanism may be provided, but without storing or establishing a UE context in the gNB-DU, in a manner similar to the RRC-less mechanism of certain embodiments. In this way, certain embodiments may provide for optimization of an RRC-based SDT mechanism that utilizes DU-stateless routing.

The embodiments of FIGS. 1-4 may relate to an RRC-less SDT mechanism for a UE served by a single CU-UP. FIG. 1 illustrates an example signal diagram 100 of assignment of R bits, according to some embodiments. For example, FIG. 1 illustrates a first DU (DU1), a second DU (DU2), a first CU-UP (CU-UP1), a second CU-UP (CU-UP2), and a CU-CP.

As illustrated at 102, the DU1 may send, and the CU-CP may receive, an F1 setup request. As illustrated at 104, the CU-CP may send, and the DU1 may receive, an F1 setup response. For example, the response may include an identifier (of length R1 bits) for the CU-UP1 and an identifier (of length R2 bits) for the CU-UP2. Similarly, at 106 and 108, the DU2 and the CU-CP may exchange an F1 setup request and an F1 setup response. In this way, during F1 setup, the CU-CP may allocate, to the CU-UPs of a network node (e.g., a gNB), identifiers of length R bits and may inform the DUs of the identifiers corresponding to the CU-UP(s) to which the DUs are connected.

As described above, FIG. 1 is provided as an example. Other examples are possible, according to some embodiments. For example, the CU-CP may later update the identifier of the CU-UP1 of length R1 bits to be considered by the DU using an F1 configuration update message. According to some embodiments, the CU-CP may, at any point in time, send an F1 configuration update message to enable or disable the RRC-less operation.

In certain embodiments, after the operations illustrated in, and described with respect to, FIG. 1, a UE connected to a DU and the CU-CP may determine a UP IP key (e.g., $K_{UPint}$)

for the UE. For example, a UP IP key may be associated with applying UP integrity protection for a UE. The CU-CP may send the determined UP IP key to the relevant CU-UP when a bearer context for the UE is created. These operations may be performed on a per-DRB basis.

Figure 2:
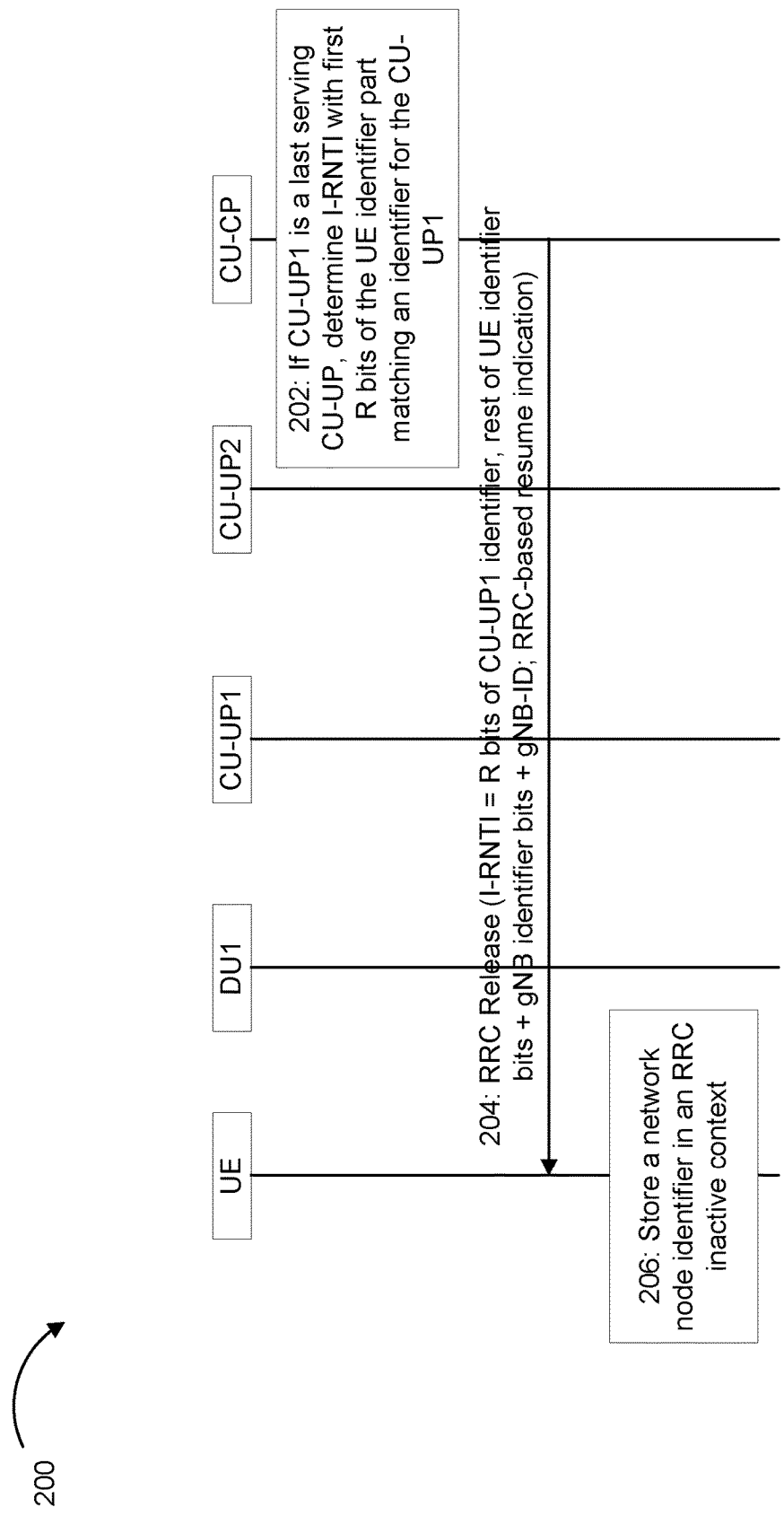
FIG. 2 illustrates an example signal diagram for assignment of an inactive radio network temporary identifier (I-RNTI), according to some embodiments.

FIG. 2 illustrates an example signal diagram 200 for assignment of an inactive radio network temporary identifier (I-RNTI), according to some embodiments. FIG. 2 illustrates a UE, the DU1, the CU-UP1, the CU-CP2, and the CU-CP. In certain embodiments, the operations illustrated in, and described with respect to, FIG. 2 may be performed after the UE and the CU-CP determine the UP IP keys described above after the description for FIG. 1.

As illustrated at 202, if the CU-UP1 is a last serving CU-UP for a UE, then the CU-CP may determine an I-RNTI with the first R bits of the UE identifier part matching an identifier for the CU-UP1. As illustrated at 204, the CU-CP may send, and the UE may receive, an RRC release message. The RRC release message may include the determined I-RNTI that includes the R bits of the CU-UP1 identifier, remaining UE identifier bits, and network node (e.g., gNB) identifier bits. According to some embodiments, the I-RNTI may include the current serving network node identifier (e.g., gNB-ID) which is to be the anchor gNB. As illustrated at 206, the UE may store this network node identifier (e.g., gNB-ID) in an RRC inactive context.

In this way, when the UE is sent to the RRC inactive state using the RRC release message, the CU-CP may allocate an I-RNTI to the UE in which the first R bits (e.g., most significant bits (MSBs)) of the UE identifier contained in the I-RNTI identifies the CU-UP1 within a network node. The identifier assigned to the CU-UP1 that is included in the I-RNTI may be the identifier described above with respect to FIG. 1.

When the R bits are statically reserved during the F1 setup procedure, the number of inactive UE contexts per CU-UP may be restricted. If a UE has to be suspended from a CU-UP more than the number of instances allowed by the remaining bits, then the RRC release message may include an indication to indicate that the UE is to use an RRC-based resume. Additionally, or alternatively, the UE context can be shifted to a CU-UP which has a fewer number of inactive contexts. For example, assuming 24 bits assigned for a gNB, if R bits occupy 8 bits, 16 bits would be available to identify the session within the CU-UP for an inactive context. If the UEs supporting SDT are mapped to the same UP due to load balancing, because of lesser active traffic and on release of the RRC connection, this UP may have more than the allowed number of UEs in an inactive state.

As indicated above, FIG. 2 is provided as an example. Other examples are possible, according to some embodiments.

Figure 3:
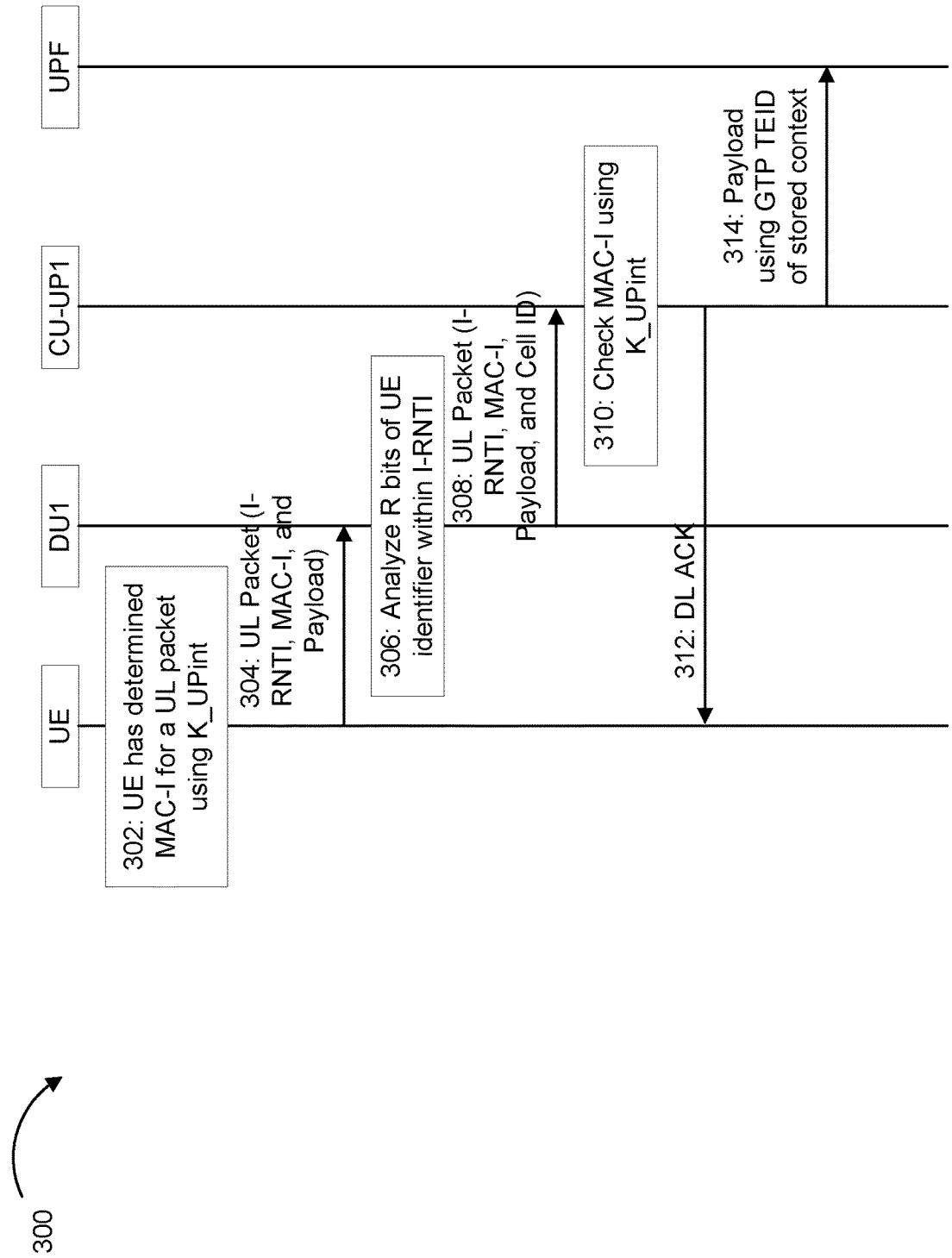
FIG. 3 illustrates an example signal diagram for a UE resuming for small data transmission, according to some embodiments.

FIG. 3 illustrates an example signal diagram 300 for a UE resuming for small data transmission, according to some embodiments. FIG. 3 illustrates the UE, the DU1, the CU-UP1, and a user plane function (UPF). In certain embodiments, the operations illustrated in, and described with respect to, FIG. 3 may be performed after the operations illustrated in, and described with respect to, FIG. 2.

As illustrated at 302, and as an initial condition, the UE may have determined a MAC-I for a UL packet using the $K_{UPint}$ ("K_UPint" in FIG. 3). According to some embodiments, the determination of this MAC-I may be based on the cell identity over which the UE is to send the UL packet. As illustrated at 304, the UE may send, and the DU1 may receive, the UL packet. For example, the UL packet may include an I-RNTI for the UE, the determined MAC-I, and a payload. In this way, when the UE wants to send a small data transmission without resuming the RRC connection, the UE may send the SDT packet to a DU indicating the I-RNTI (e.g., in the medium access control header (MAC header) or a medium access control (MAC) control element (CE)), the MAC-I of the UP IP, and the data payload without an RRC message (e.g., using RRC-less SDT).

As illustrated at 306, the DU1 may analyze R bits of the UE identifier within the I-RNTI to determine whether the R bits match an identifier of a CU-UP to which the DU is connected. As illustrated at 308, if the analysis results in a match (e.g., the R bits match the identifier for CU-UP1), the DU1 may send, and the CU-UP1 may receive, the UL packet. For example, the UL packet may include the same contents as received from the UE, and may additionally include an identifier for a cell to which the UE is connected ("Cell ID" in FIG. 3). As illustrated at 310, the CU-UP1 may check the MAC-I using the $K_{UPint}$. As illustrated at 312, the CU-UP1 may send, and the UE may receive, a DL message (e.g., a DL acknowledgement (ACK)). As illustrated at 314, the CU-UP1 may send, and the UPF may receive, the payload from the UL packet. For example, the CU-UP1 may send the payload using a general packet radio service (GPRS) tunneling protocol (GTP) tunnel endpoint identifier (TEID) of a stored context for the UE.

As described above with respect to the operations at 306-314, the DU may receive information from the UE and may analyze the first R bits (e.g., MSB) of the UE identifier part of the I-RNTI. In certain embodiments, the R bits may not be the first R bits, but may be R bits within the UE identifier part of the I-RNTI determined according to some predefined bitmap. If the R bits match one of the CU-UP(s) to which the DU is connected, then the DU may forward the packet to those CU-UP(s). After this, the CU-UP(s) may retrieve the UE context from the received I-RNTI and may use the received UP MAC-I to check the authenticity of the packet.

Alternatively, the DU may forward the packet to the CU-UP(s) together with an incoming cell identifier (e.g., a PCI), and the CU-UPs may then retrieve the UE context for the received I-RNTI. The CU-UP may compute a new MAC-I based on a stored UP IP key and the cell identifier received from DU and may compare the computed UP MAC-I with the received UP MAC-I to check the authenticity of the packet. If the check is successful the CU-UP may forward the uplink payload to the UPF and may send a message (e.g., a layer-2 ACK) towards the UE. In certain embodiments, the CU-UP may calculate a short-mobile authentication code (short-MAC) based on the generated layer-2 ACK and I-RNTI as inputs. This short-MAC can be included as a MAC-CE (control element) in the ACK message towards UE for increasing the security of the network response.

In some embodiments, it may be assumed that a default radio link control (RLC) bearer configuration may be used for SDT. This may allow the DU to process an RLC protocol data unit (PDU) without storing any UE-specific context.

As described above, FIG. 3 is provided as an example. Other examples are possible, according to some embodiments.

Figure 4:
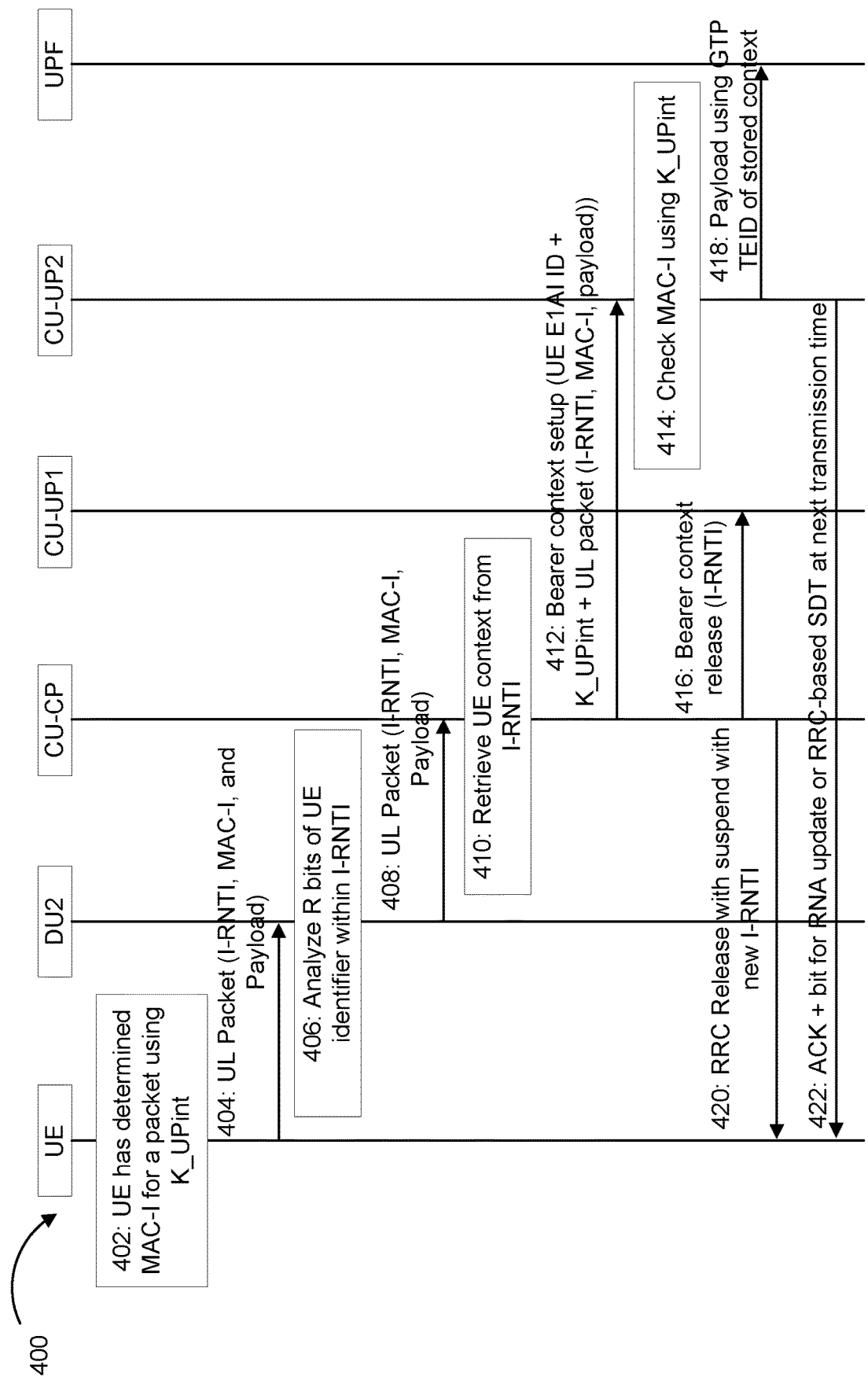
FIG. 4 illustrates an example signal diagram for a UE resuming for small data transmission, according to some embodiments.

FIG. 4 illustrates an example signal diagram 400 for a UE resuming for small data transmission, according to some embodiments. FIG. 4 illustrates the UE, the DU2, the CU-CP, the CU-UP1, the CU-UP2, and the UPF. In certain embodiments, the operations illustrated in, and described with respect to, FIG. 4 may be performed after the operations illustrated in, and described with respect to, FIG. 2. For example, while FIG. 3 illustrated certain embodiments where analysis of an I-RNTI in a packet is successful, FIG. 4 below illustrates certain embodiments where the analysis is unsuccessful.

The operations at 402 and 404 may be similar to the operations at 302 and 304 described above, respectively. As illustrated at 406, the DU2 may analyze R bits of the UE identifier within the I-RNTI to determine whether the R bits match an identifier for a CU-UP to which the DU is connected. As illustrated at 408, if the analysis does not result in a match to any of the CU-UPs to which the DU is connected, then the DU may send, and the CU-CP may receive, the UL packet with the same contents as that received from the UE but which may additionally include a cell identifier of the cell over which the packet was received. As illustrated at 410, the CU-CP may retrieve the UE context from the I-RNTI. As illustrated at 412, the CU-CP may send, and the CU-UP2 may receive, a bearer context setup. For example, the bearer context setup may include an E1AI identifier, the $K_{UPint}$ ("K_UPint" in FIG. 4), and the UL packet received from the DU. The packet received from the DU may include a cell identifier to enable the CU-UP to compute the MAC-I.

As illustrated at 414, the CU-UP2 may check the MAC-I in the UL packet using the $K_{UPint}$. In certain embodiments, the CU-CP, rather than the CU-UP2, may perform the check. As illustrated at 416, the CU-CP may send, and the CU-UP1 may receive, a bearer context release (e.g., that includes the I-RNTI originally included in the UL packet). As illustrated at 418, the CU-UP2 may send, and the UPF may receive, the payload using the GTP TEID of the stored context. As illustrated at 420, the CU-CP may send, and the UE may receive, a release message for the context. The release message may include a suspend indication and a new I-RNTI for the UE. As illustrated at 422, the CU-UP2 may send, and the UE may receive a message. For example, the message may include an ACK and one or more bits to request the UE to perform an RNA update or to perform an RRC-based SDT at a next transmission time.

As described above with respect to operations 406-422, the CU-CP may analyze R bits of a UE identifier within an I-RNTI in a UL packet. If the R bits fail to match any CU-UP to which the DU is connected, then the DU may forward the packet to the CU-CP. The CU-CP may select a CU-UP of the DU (e.g., of the CU-UPs to which the DU is connected) and may create a bearer context while forwarding the received packet to the selected CU-UP together with a cell identifier. In certain embodiments, the CU-CP may select a CU-UP of the DU where it creates a bearer context and obtains a UL F1 TEID to be used by the DU. In this case, the CU-CP may send the obtained UL F1 TEID of the selected CU-UP to the DU to create an HU tunnel. The DU may send the UL packet over this HU tunnel to the selected CU-UP.

The CU-UP may use the received UP IP key (part of the context) and the received MAC-I (part of the UL packet) to check the authenticity of the packet. The CU-UP may also use the received cell identity. If the check is successful, then the CU-UP may forward the payload to the UPF. The CU-CP may delete the context in the previous CU-UP. There may be one or more options for acknowledgement to the UE. For example, the CU-CP may initiate an RRC release to send the UE to an inactive state while allocating a new I-RNTI. As another example, the selected CU-UP may send a layer-2 ACK to the UE with an indication to cause the UE to use the RRC-based SDT transmission for a subsequent SDT, or to perform an RNA update.

As described above, FIG. 4 is provided as an example. Other examples are possible, according to some embodiments.

It is possible that a UE may be sent to an RRC inactive state with multiple DRBs which may not be associated with the same CU-UP. In this case, certain variations may be implemented with respect to the embodiments of FIGS. 2-4. For example, if the UE has a DRB1 associated with the CU-UP1 and a DRB2 associated with the CU-UP2, then the CU-CP may calculate an I-RNTI1 for the DRB1 (with R bits identifying the CU-UP1) and an I-RNTI2 for the DRB2 (with R bits identifying the CU-UP2). Then, in the RRC release message to the UE to cause the UE to enter an RRC inactive state, the CU-CP may indicate the mapping between I-RNTIs and DRBs (e.g., may indicate that DRB1 maps to I-RNTI1 and that DRB2 maps to I-RNTI2). In some cases when a UE is associated with more than two CU-UPs, certain embodiments may be extendable for addition of as many I-RNTIs as CU-UPs.

This may result in reduced impact on performance. For example, the UE may indicate the I-RNTI corresponding to the DRB for which a SDT transmission is going to be performed. Additionally, or alternatively, the UE may use any of the I-RNTIs while performing a periodic RAN notification area update (RNAU) since the RNAU procedure may have no association with a CU-UP. Alternatively, the UE may be configured with rules on which I-RNTI to use for the RNAUs.

When the UE resumes to send a packet, if the data payload is associated with the DRB1, the UE may send the medium access control PDU (MAC PDU) including the I-RNTI 1, the MAC-I of the UP IP, and a data payload. If the data payload is associated with the DRB2, the UE may send the MAC PDU including the I-RNTI 2, the MAC-I of the UP IP, and the data payload.

Figure 5:
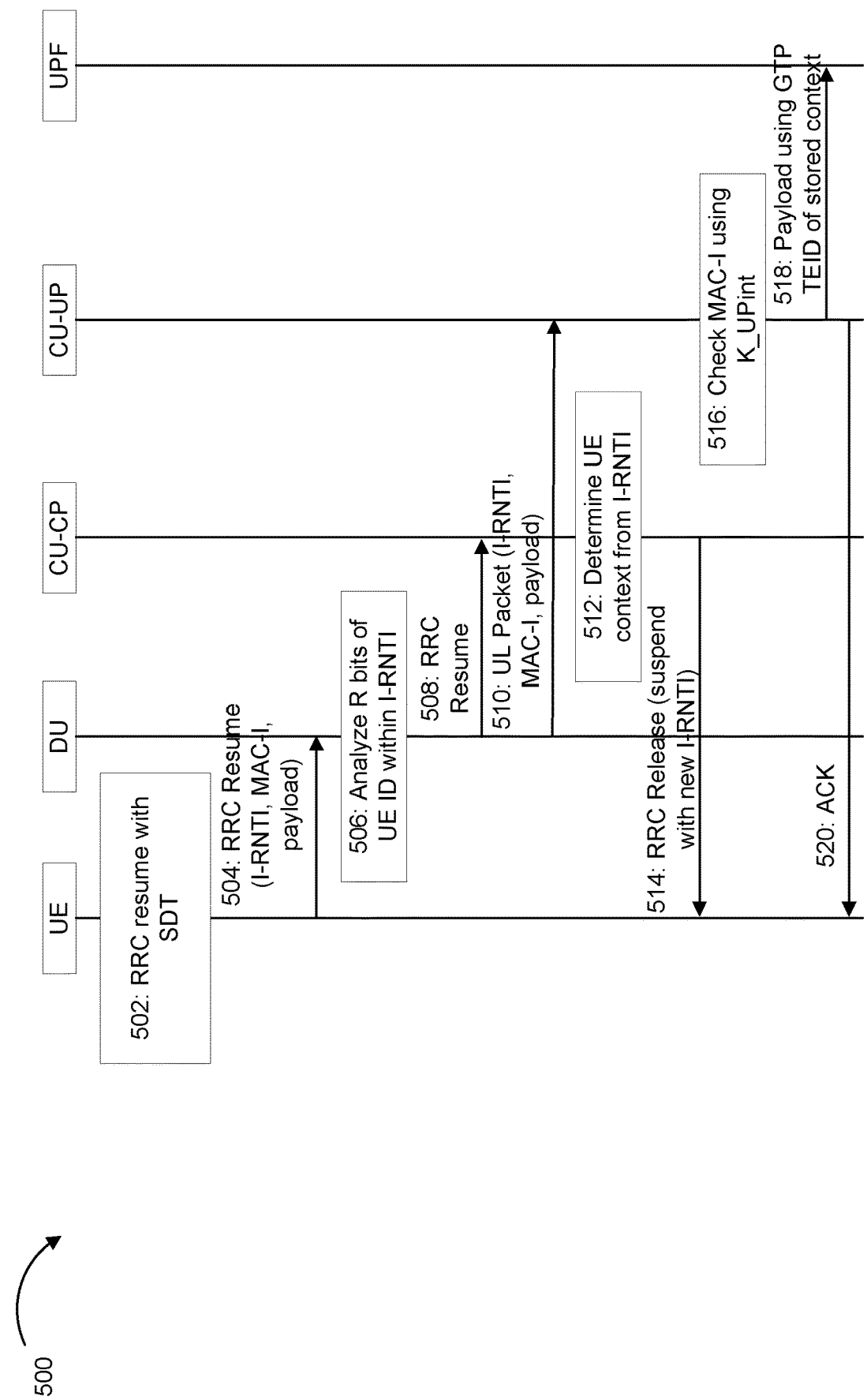
FIG. 5 illustrates an example signal diagram for use of a distributed unit (DU) stateless direct routing for radio resource control (RRC)-based operations, according to some embodiments.

FIG. 5 illustrates an example signal diagram for use of a distributed unit (DU) stateless direct routing for radio resource control (RRC)-based operations, according to some embodiments. FIG. 5 illustrates a UE, a DU, a CU-CP, a CU-UP, and a UPF. While FIGS. 3 and 4 illustrate certain embodiments for an RRC-less mechanism, certain embodiments illustrated in, and described with respect to, FIG. 5 may provide an RRC-based mechanism to be performed after the embodiments illustrated in, and described with respect to, FIG. 2.

As illustrated at 502, the UE may determine to perform an RRC resume with SDT. As illustrated at 504, the UE may send, and the DU may receive, the RRC resume. For example, the RRC resume may include an SDT UL packet that includes I-RNTI for the UE, a MAC-I, and a payload. As illustrated at 506, the DU may analyze R bits of the UE identifier within the I-RNTI to determine whether the R bits match an identifier of a CU-UP to which the DU is connected. If the analysis results in a match, then, at 508, the DU may send the RRC resume message to the CU-CP. In addition, at 510, the DU may send the UL packet to the CU-UP associated with the identifier that matches the R bits.

As illustrated at 512, the CU-CP may determine the UE context from the I-RNTI. As illustrated at 514, the CU-CP may send, and the UE may receive, an RRC release message. For example, the RRC release message may include an indication to suspend the RRC connection and may include a new I-RNTI. As illustrated at 516, the CU-UP may check the MAC-I using the $K_{UPint}$ ("K_UPint" in FIG. 5). As illustrated at 518, the CU-UP may send, and the UPF may receive, the payload from the UL packet. For example, the payload may be sent using the GTP TEID of the stored context. As illustrated at 520, the CU-UP may send, and the UE may receive, an ACK. For example, the ACK may indicate that the payload has been forwarded to the UPF.

In this way, the direct routing of UL data from DU to the CU-UP based on the R bits in I-RNTI can be applied irrespective of RRC-less or RRC-based SDT mechanisms. Thus, certain embodiments described herein may provide a network signaling reduction (e.g., by removing the UE-specific F1U procedures in certain embodiments). For certain embodiments that provide an RRC-based SDT mechanism, the DU may split the UL packet and may send the RRC message to the CU-CP and may send the user plane part of the packet to the CU-UP directly, using the R bits of the UE identifier part of the I-RNTI.

As described above, FIG. 5 is provided as an example. Other examples are possible, according to some embodiments.

Figure 6:
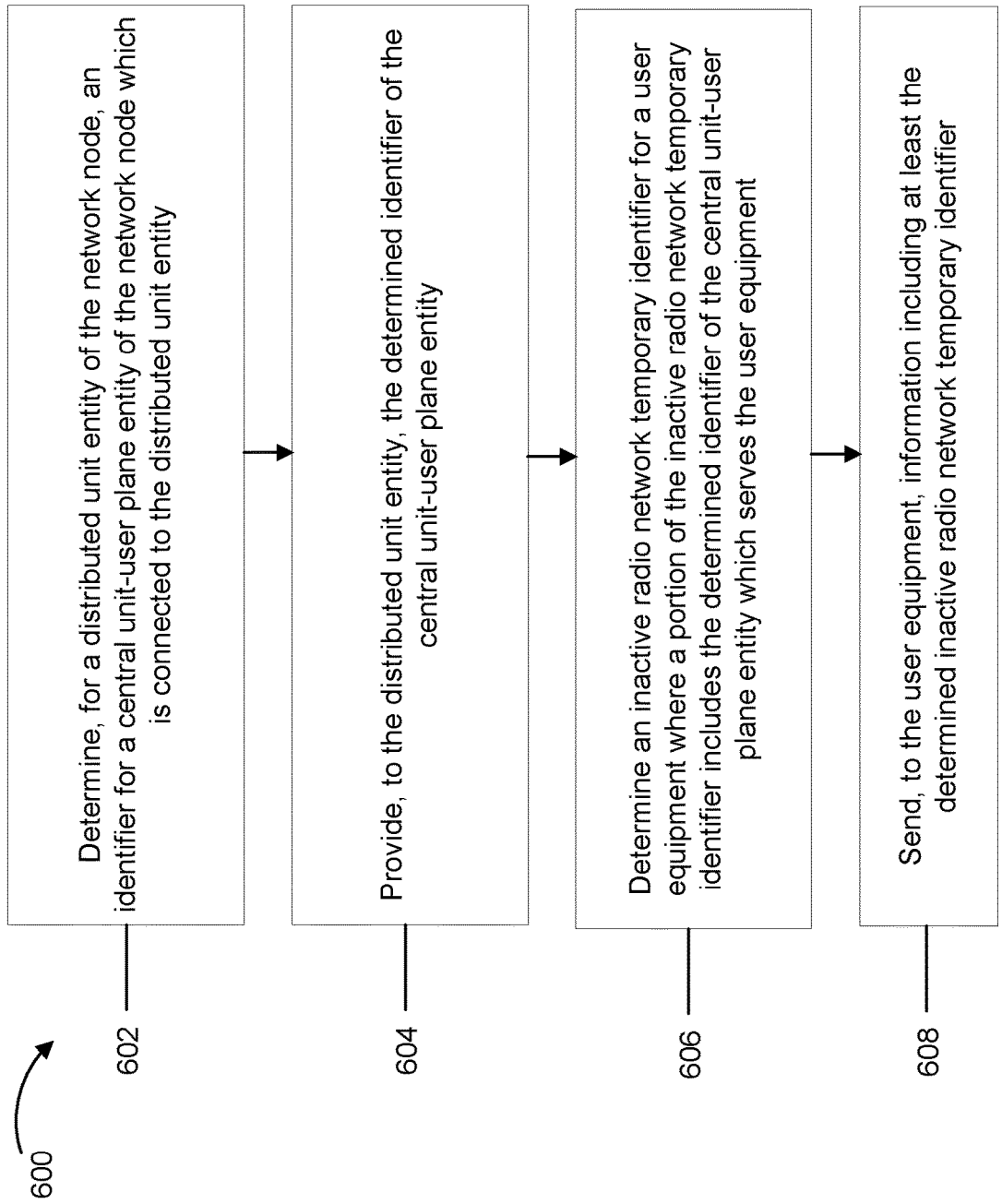
FIG. 6 illustrates an example flow diagram of a method, according to some embodiments.

FIG. 6 illustrates an example flow diagram of a method 600, according to some embodiments. For example, FIG. 6 shows example operations of a network node (e.g., apparatus 10 illustrated in, and described with respect to, FIG. 10*a*). In particular, FIG. 6 may illustrate some operations of a CU-CP entity. Some of the operations illustrated in FIG. 6 may be similar to some operations shown in, and described with respect to, FIGS. 1-5.

In an embodiment, the method may include, at 602, determining, for a distributed unit entity of the network node, an identifier for a central unit-user plane entity of the network node which is connected to the distributed unit entity. The method may include, at 604, providing, to the distributed unit entity, the determined identifier of the central unit-user plane entity. The method may include, at 606, determining an inactive radio network temporary identifier for a user equipment where a portion of the inactive radio network temporary identifier includes the determined identifier of the central unit-user plane entity which serves the user equipment. The method may include, at 608, sending, to the user equipment, information including at least the determined inactive radio network temporary identifier.

The method illustrated in FIG. 6 may include one or more additional aspects described below or elsewhere herein. In some embodiments, the method may include providing an update of the identifier of the central unit-user plane entity to the distributed unit entity or an indication that radio resource control-less small data transmission is disabled or enabled. In some embodiments, the portion of the inactive radio network temporary identifier may be statically reserved. In some embodiments, the information may include an indication to indicate to the user equipment to use a radio resource control-based small data transmission procedure for a subsequent small data transmission. In some embodiments, the information may include an identifier of the network node.

In some embodiments, the method may include receiving a packet including the inactive radio network temporary identifier from the distributed unit entity, identifying a context of the user equipment using the received inactive radio network temporary identifier, selecting another central unit-user plane entity associated with the distributed unit entity different than the central unit-user plane entity serving the user equipment, sending the context and the packet to the other central unit-user plane entity, and triggering deletion of the user equipment context in the former central unit-user plane entity. In some embodiments, the method may include receiving a packet including the inactive radio network temporary identifier from the distributed unit entity, identifying a context of the user equipment using the received inactive radio network temporary identifier, creating a context and obtaining a tunnel endpoint for the user equipment in another central unit-user plane entity associated with the distributed unit entity, sending the obtained tunnel endpoint to the distributed unit, and triggering deletion of the user equipment context in the former central unit-user plane entity. In some embodiments, the other central unit-user plane entity may be different than the central unit-user plane entity serving the user equipment.

In some embodiments, the method may include allocating a new inactive radio network temporary identifier, and including the new inactive radio network temporary identifier in the information sent to the user equipment. In some embodiments, the information sent to the user equipment may further comprise a mapping between the inactive radio network temporary identifier and a data radio bearer and between one or more other inactive radio network temporary identifiers and one or more other data radio bearers. In some embodiments, the method may include receiving a radio resource control message including the inactive radio network temporary identifier and a control plane mobile authentication code-integrity from the distributed unit entity, identifying a context of the user equipment using the received inactive radio network temporary identifier, checking a validity of the control plane mobile authentication code-integrity, and sending a result of the checking to the distributed unit entity or the central unit-user plane entity serving the user equipment.

In some embodiments, the sending at 608 may include sending the information in one of: a radio resource control message, a medium access control element, or a system information message. In some embodiments, the information may comprise a request to move the user equipment to a radio resource control inactive state.

As described above, FIG. 6 is provided as an example. Other examples are possible according to some embodiments.

Figure 7:
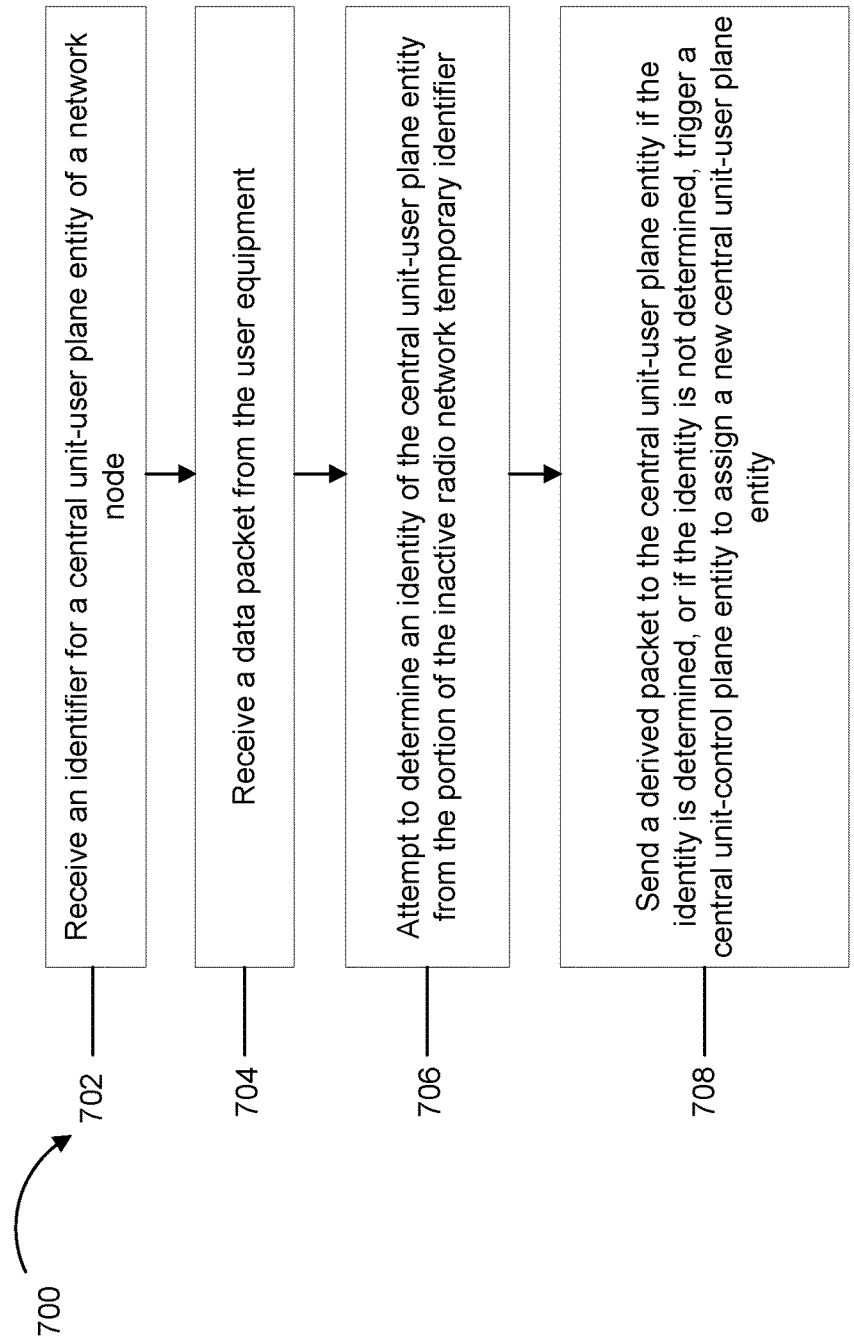
FIG. 7 illustrates an example flow diagram of a method, according to some embodiments.

FIG. 7 illustrates an example flow diagram of a method 700, according to some embodiments. For example, FIG. 7 shows example operations of a network node (e.g., apparatus 10 illustrated in, and described with respect to, FIG. 10*a*). In particular, FIG. 7 may illustrate some operations of a distributed unit entity. Some of the operations illustrated in FIG. 7 may be similar to some operations shown in, and described with respect to, FIGS. 1-5.

In an embodiment, the method may include, at 702, receiving an identifier for a central unit-user plane entity of a network node. The distributed unit entity may be connected with the central unit-user plane entity. The method may include, at 704, receiving a data packet from the user equipment. The data packet may include at least a payload and an inactive radio network temporary identifier, and may optionally include a radio resource control message (e.g., the data packet may include at least the payload and the I-RNTI, and may additionally include the RRC message). The payload may optionally include a user plane integrity protection code. A portion of the inactive radio network temporary identifier may include the identifier of the central unit-user plane entity. The method may include, at 706, attempting to determine an identity of the central unit-user plane entity from the portion of the inactive radio network temporary identifier. The method may include, at 708, sending a derived packet to the central unit-user plane entity if the identity is determined, or if the identity is not determined, triggering a central unit-control plane entity to assign a new central unit-user plane entity.

The method illustrated in FIG. 7 may include one or more additional aspects described below or elsewhere herein. In some embodiments, the method may include, if the identity is not determined, either: forwarding the packet to the central unit-control plane entity for further forwarding of the derived packet, or holding the derived packet until a tunnel endpoint of the assigned central unit-user plane entity or an identification of the assigned control unit-user plane entity is obtained from the central unit-control plane entity and sending the derived packet to the assigned central unit-user plane entity. In some embodiments, the sending at 708 may include sending the derived packet based on an indication received from the central unit-control plane entity that a control plane mobile authentication code-integrity is successful. In some embodiments, the method may include receiving, from the central unit-control plane entity, an update of the identifier of the central unit-user plane entity or an indication that radio resource control-less small data transmission is disabled or enabled.

In some embodiments, the attempting at 706 may include attempting to determine the identity based on a particular medium access control frame format, a particular indication in the medium access control control element, a presence of a radio resource control message, or a particular bit included in the received data packet. In some embodiments, the sending at 708 may include sending the payload and the inactive radio network temporary identifier to the central unit-user plane entity and optionally sending information related to integrity protection validation (e.g., the sending may include sending at least the payload and the I-RNTI, and may additionally include sending the information related to the integrity protection validation). In some embodiments, the information related to the integrity protection validation may include the identifier of a cell managed by the distributed unit entity over which the packet was received.

In some embodiments, the packet may be received without a radio resource control message. In some embodiments, the inactive radio network temporary identifier included in the packet may be associated with a particular data radio bearer. In some embodiments, the packet may further comprise a radio resource control message. In some embodiments, the method may include sending the radio resource control message to the central unit-control plane entity when sending the derived packet. In some embodiments, a presence of a MAC-I may be an indicator for the DU to decide whether to forward to the packet to a CU-CP or not. The DU upon receiving the packet may perform the following check: if there is a MAC-I (meaning there is CP IP), then the DU may forward the packet along with a MAC-I to the CU-CP. Certain embodiments can also hold the packet (at the DU or CU UP) and may wait for an ACK. If there is no MAC-I, certain embodiments may directly forward the packet to the CU-UP (meaning there is UP IP).

As described above, FIG. 7 is provided as an example. Other examples are possible according to some embodiments.

Figure 8:
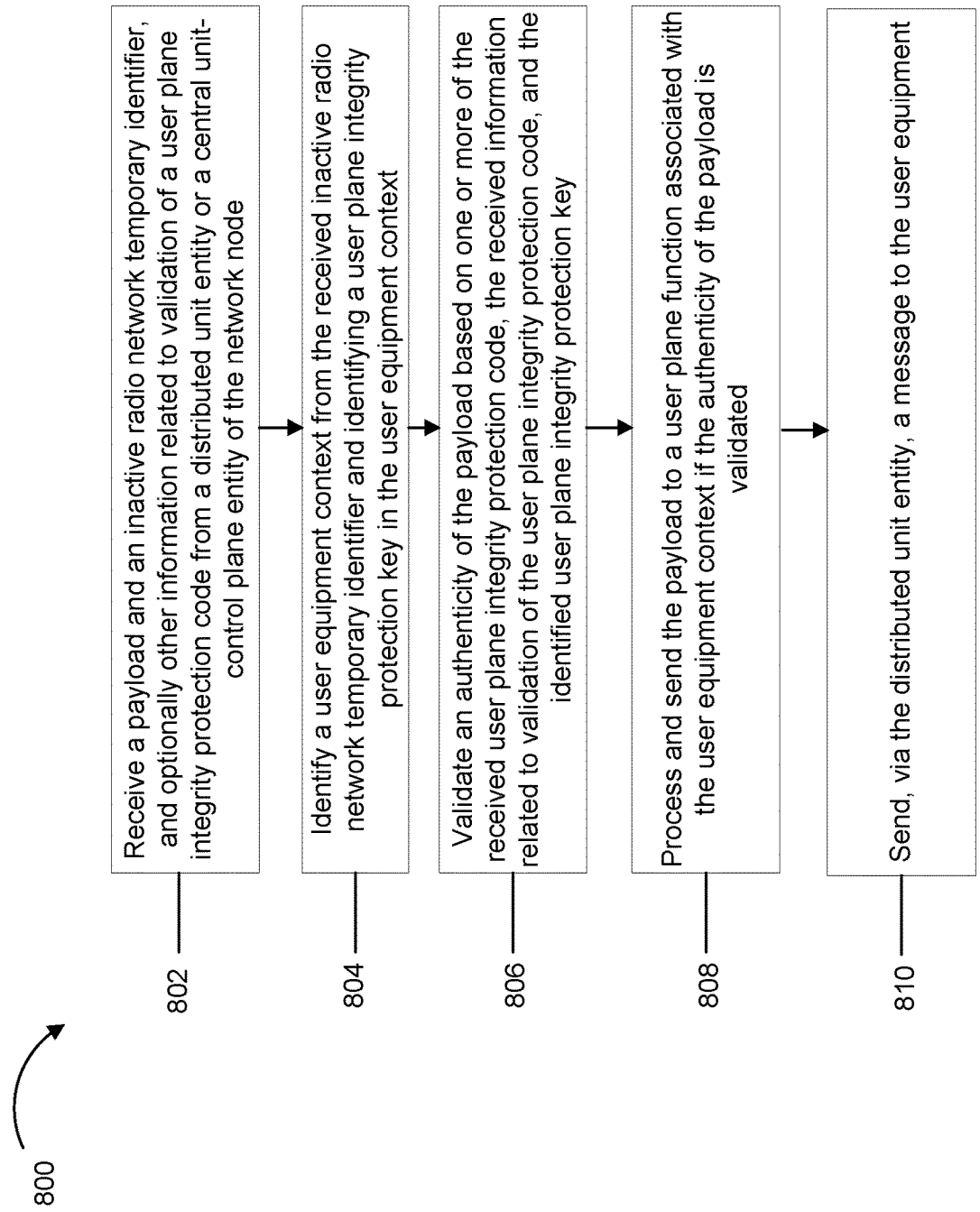
FIG. 8 illustrates an example flow diagram of a method, according to some embodiments.

FIG. 8 illustrates an example flow diagram of a method 800, according to some embodiments. For example, FIG. 8 shows example operations of a network node (e.g., apparatus 10 illustrated in, and described with respect to, FIG. 10*a*). In particular, FIG. 8 may illustrate some operations of a CU-UP entity. Some of the operations illustrated in FIG. 8 may be similar to some operations shown in, and described with respect to, FIGS. 1-5.

In an embodiment, the method may include, at 802, receiving a payload and an inactive radio network temporary identifier, and optionally other information related to validation of a user plane integrity protection code from a distributed unit entity or a central unit-control plane entity of the network node (e.g., at least the payload and the I-RNTI may be received, and the information may additionally be received). The central unit-user plane entity may be connected to the distributed unit entity. The payload may include a user plane integrity protection code. The method may include, at 804, identifying a user equipment context from the received inactive radio network temporary identifier and identifying a user plane integrity protection key in the user equipment context. The method may include, at 806, validating an authenticity of the payload based on one or more of the received user plane integrity protection code, the received information related to validation of the user plane integrity protection code, and the identified user plane integrity protection key. The method may include, at 808, processing and sending the payload to a user plane function associated with the user equipment context if the authenticity of the payload is validated. If there is no MAC-I in the packet, the CU-UP may wait for an ACK (that includes a CU IP) from the CU-CP before forwarding the packet to the UPF. The method may include, at 810, sending, via the distributed unit entity, a message to the user equipment. The message may indicate that the payload has been successfully processed.

The method illustrated in FIG. 8 may include one or more additional aspects described below or elsewhere herein. In some embodiments, the message may comprise a layer 2 acknowledgement or may comprise a short mobile authentication code in a medium access control control element. In some embodiments, the method may include receiving the user equipment context from the central unit-control plane entity. In some embodiments, the message additionally comprise a particular indication to request the user equipment to use a radio resource control-based small data transmission for a subsequent small data transmission or to perform a radio area network notification area update procedure.

As described above, FIG. 8 is provided as an example. Other examples are possible according to some embodiments.

FIG. 9 illustrates an example flow diagram of a method 900, according to some embodiments. For example, FIG. 9 shows example operations of a UE (e.g., apparatus 20 illustrated in, and described with respect to, FIG. 10*b*). Some of the operations illustrated in FIG. 9 may be similar to some operations shown in, and described with respect to, FIGS. 1-5.

In an embodiment, the method may include, at 902, determining whether to use a radio resource control-less or radio resource control-based method to send a small data transmission packet. The method may include, at 904, determining an inactive radio network temporary identifier corresponding to a data radio bearer using received mapping information between inactive radio network temporary identifiers and data radio bearers.

The method illustrated in FIG. 9 may include one or more additional aspects described below or elsewhere herein. In some embodiments, the method may include determining a user plane integrity protection code for a payload based on the determination of the radio resource method, sending the small data transmission packet to a distributed unit entity, wherein the packet comprises the payload and the inactive radio network temporary identifier and optionally comprises a radio resource control message for the user equipment, receiving a message from a central unit-user plane entity of the network node via the distributed unit entity, and authenticating the message based on a short mobile authentication code included in the message. In some embodiments, the payload may include the user plane integrity protection code. In some embodiments, the method may include receiving, from a central unit-control plane entity of the network node, information comprising the mapping between the data radio bearers and the inactive radio network temporary identifiers.

In some embodiments, a portion of the inactive radio network temporary identifier includes an identifier of a central unit-user plane entity. In some embodiments, the message may indicate that the packet has been successfully processed by the network node. In some embodiments, the inactive radio network temporary identifier included in the packet sent by the user equipment may be related to a data radio bearer to which the payload belongs using the received mapping information. In some embodiments, the receiving the information may include receiving the information in one of: a radio resource control message, a medium access control element, or a system information message. In some embodiments, the information may include a request to move the user equipment to a radio resource control inactive state.

As described above, FIG. 9 is provided as an example. Other examples are possible according to some embodiments.

Figure 10B:
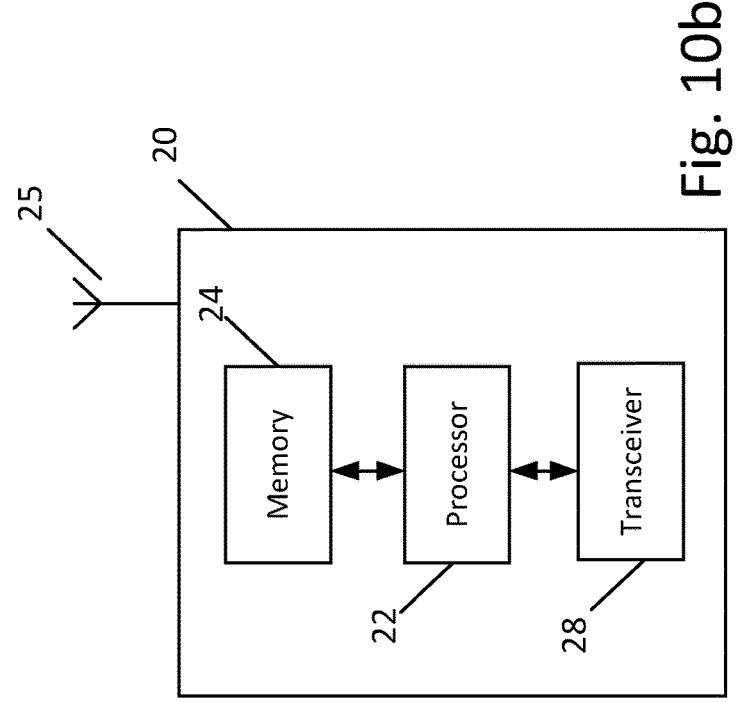
FIG. 10b illustrates an example block diagram of an apparatus, according to another embodiment.
Figure 10A:
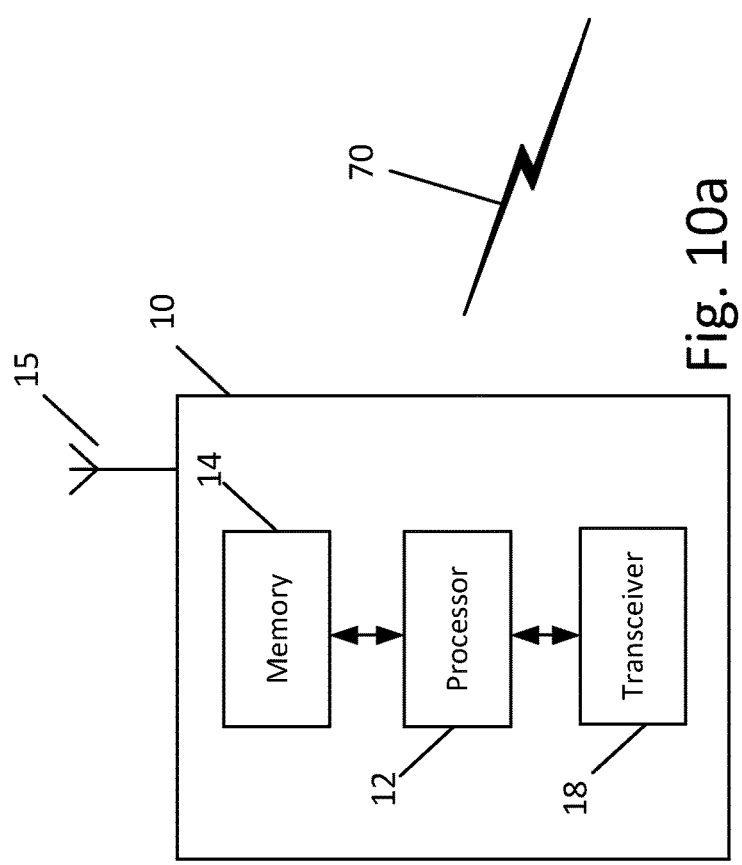
FIG. 10a illustrates an example block diagram of an apparatus, according to an embodiment.

FIG. 10a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 10a.

As illustrated in the example of FIG. 10a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-8. For instance, apparatus 10 may be controlled by memory 14 and processor 12 to perform the methods of FIGS. 6-8.

FIG. 10b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 10b.

As illustrated in the example of FIG. 10b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-5 and 9. For instance, in one embodiment, apparatus 20 may be controlled by memory 24 and processor 22 to perform the method of FIG. 9.

In some embodiments, an apparatus (e.g., apparatus 10 and/or apparatus 20) may include means for performing a method or any of the variants discussed herein, e.g., a method described with reference to FIGS. 6-9. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is reducing or eliminating the need for any context stored in the DU for the UEs in an RRC inactive state. Additionally, or alternatively, certain embodiments may be used even if the UE reconnects to a cell belonging to a different DU of the same gNB with the same performance as if it reconnects to the original serving cell/DU (e.g., in both cases the same CU-UP may be retained and the UP IP validation can be performed along with UP deciphering). Accordingly, the use of some example embodiments results in improved functioning of communications networks and their nodes and, therefore constitute an improvement at least to the technological field of routing at a DU, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single UE equally applies to embodiments that include multiple instances of the UE, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

AMF Access and Mobility Management Function
CP Control Plane
NR New Radio
gNB 5G Node B
I-RNTI Inactive Radio network temporary identifier
NCC Next Hop Chaining Count
NG-RAN Next Generation-Radio Access Network
NR New Radio
RAN Radio Access Network
RNA RAN Notification area
RNAU RAN Notification area Update
RRC Radio Resource Control protocol
UE User Equipment
UP User Plane
Xn Xn network interface

What is claimed is:

1. An apparatus, comprising:
at least one processor; and
at least one memory comprising computer program code, the at least one memory and computer program code configured, with the at least one processor, to cause the apparatus at least to:
determine, by the apparatus for a distributed unit entity of a network node, an identifier for a central unit-user plane entity of the network node which is connected to the distributed unit entity;
provide, to the distributed unit entity, the determined identifier of the central unit-user plane entity;
determine an inactive radio network temporary identifier for a user equipment, wherein a portion of the inactive radio network temporary identifier includes the identifier of the central unit-user plane entity which serves the user equipment; and
send, to the user equipment, information including at least the determined inactive radio network temporary identifier,
wherein the at least one memory and computer program code are further configured, with the at least one processor, to cause the apparatus at least to:
receive a packet including the inactive radio network temporary identifier from the distributed unit entity;
identify a context of the user equipment using the received inactive radio network temporary identifier:
select another central unit-user plane entity associated with the distributed unit entity different than the central unit-user plane entity serving the user equipment;
send the context and the packet to the other central unit-user plane entity; and
trigger deletion of the user equipment context in the former central unit-user plane entity.

2. The apparatus according to claim 1, wherein the at least one memory and computer program code are further configured, with the at least one processor, to cause the apparatus at least to:
provide an update of the identifier of the central unit-user plane entity to the distributed unit entity or an indication that radio resource control-less small data transmission is disabled or enabled.

3. The apparatus according to claim 1, wherein the portion of the inactive radio network temporary identifier is statically reserved.

4. The apparatus according to claim 1, wherein the information includes an identifier of the network node.

5. The apparatus according to claim 1, wherein the at least one memory and computer program code are further configured, with the at least one processor, to cause the apparatus at least to:
receive a packet including the inactive radio network temporary identifier from the distributed unit entity;
identify a context of the user equipment using the received inactive radio network temporary identifier;
create a context and obtaining a tunnel endpoint for the user equipment in another central unit-user plane entity associated with the distributed unit entity, wherein the other central unit-user plane entity is different than the central unit-user plane entity serving the user equipment;
send the obtained tunnel endpoint to the distributed unit entity; and
trigger deletion of the user equipment context in the former central unit-user plane entity.

6. The apparatus according to claim 1, wherein the information sent to the user equipment further comprises a mapping between the inactive radio network temporary identifier and a data radio bearer and between one or more other inactive radio network temporary identifiers and one or more other data radio bearers.

7. The apparatus according to claim 1, wherein the at least one memory and computer program code are further configured, with the at least one processor, to cause the apparatus at least to:
receive a radio resource control message including the inactive radio network temporary identifier, and a control plane mobile authentication code-integrity from the distributed unit entity;
identify a context of the user equipment using the received inactive radio network temporary identifier;
check a validity of the control plane mobile authentication code-integrity; and
send a result of the checking to the distributed unit entity or the central unit-user plane entity serving the user equipment.

8. An apparatus, comprising:
at least one processor; and
at least one memory comprising computer program code, the at least one memory and computer program code configured, with the at least one processor, to cause the apparatus at least to:
receive, by the apparatus, an identifier for a central unit-user plane entity of a network node, wherein the apparatus is connected with the central unit-user plane entity;

receive a data packet from a user equipment, wherein the data packet includes at least a payload and an inactive radio network temporary identifier, wherein a portion of the inactive radio network temporary identifier includes the identifier of the central unit-user plane entity;

attempt to determine an identity of the central unit-user plane entity from the portion of the inactive radio network temporary identifier; and sending a packet derived from the received data packet to the central unit-user plane entity if the identity is determined, or if the identity is not determined, triggering a central unit-control plane entity to assign a new central unit-user plane entity.

9. The apparatus according to claim 8, wherein the at least one memory and computer program code are further configured, with the at least one processor, to cause the apparatus at least to:

if the identity is not determined, either:
forward the derived packet to the central unit-control plane entity for further forwarding of the derived packet, or
hold the derived packet until a tunnel endpoint of the assigned central unit-user plane entity or an identification of the assigned control unit-user plane entity is obtained from the central unit-control plane entity and sending the derived packet to the assigned central unit-user plane entity.

10. The apparatus according to claim 8, wherein the at least one memory and computer program code configured to send the derived packet are further configured, with the at least one processor, to cause the apparatus at least to:

send the derived packet based on an indication received from the central unit-control plane entity that a control plane mobile authentication code-integrity is successful.

11. The apparatus according to claim 8, wherein the at least one memory and computer program code are further configured, with the at least one processor, to cause the apparatus at least to:

receive, from the central unit-control plane entity, an update of the identifier of the central unit-user plane entity or an indication that radio resource control-less small data transmission is disabled or enabled.

12. The apparatus according to claim 8, wherein the at least one memory and computer program code configured to attempt to determine the identity are further configured, with the at least one processor, to cause the apparatus at least to:

attempt to determine the identity based on a particular medium access control frame format, a particular indication in the medium access control control element, a presence of a radio resource control message, or a particular bit included in the received data packet.

13. The apparatus according claim 8, wherein the at least one memory and computer program code configured to send the derived packet are further configured, with the at least one processor, to cause the apparatus at least to:

send the payload and the inactive radio network temporary identifier to the central unit-user plane entity and optionally sending information related to integrity protection validation.

14. The apparatus according to claim 8, wherein the inactive radio network temporary identifier included in the packet is associated with a particular data radio bearer.

15. An apparatus, comprising:
at least one processor; and
at least one memory comprising computer program code, the at least one memory and computer program code configured, with the at least one processor, to cause the apparatus at least to:
determine by the apparatus whether to use a radio resource control-less or radio resource control-based method to send a small data transmission packet; and
determine an inactive radio network temporary identifier corresponding to a data radio bearer using received mapping information received from a network node between inactive radio network temporary identifiers and data radio bearers, wherein the at least one memory and computer program code are further configured, with the at least one processor, to cause the apparatus at least to:
determine a user plane integrity protection code for a payload based on the determination of the radio resource method:
send the small data transmission packet to a distributed unit entity, wherein the packet comprises the payload and the inactive radio network temporary identifier, wherein the payload comprises the user plane integrity protection code;
receive a message from a central unit-user plane entity of the network node via the distributed unit entity; and
authenticate the message based on a short mobile authentication code included in the message.

16. The apparatus according to claim 15, wherein the at least one memory and computer program code are further configured, with the at least one processor, to cause the apparatus at least to:

receive, from a central unit-control plane entity of the network node, information comprising the mapping between the data radio bearers and the inactive radio network temporary identifiers.

17. The apparatus according to claim 15, wherein a portion of the inactive radio network temporary identifier includes an identifier of a central unit-user plane entity.

18. The apparatus according to claim 15, wherein a message indicates that the packet has been successfully processed by the network node.

* * * * *